Oct. 21, 1969     C. F. MARQUIS ET AL     3,474,240
APPARATUS FOR ANALYZING GRAPHICALLY PLOTTED INFORMATION
Filed Feb. 11, 1966     4 Sheets-Sheet 1

INVENTORS
CHARLES F. MARQUIS
PIERRE G. DRIAY
PAUL P. LAMBILLIOTTE
BY Bacon & Thomas
ATTORNEYS Oct. 21, 1969  C. F. MARQUIS ET AL  3,474,240
APPARATUS FOR ANALYZING GRAPHICALLY PLOTTED INFORMATION
Filed Feb. 11, 1966  4 Sheets-Sheet 3
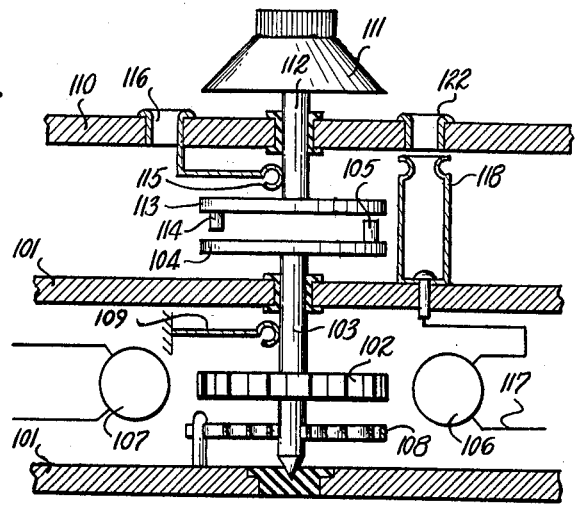
Fig. 5.
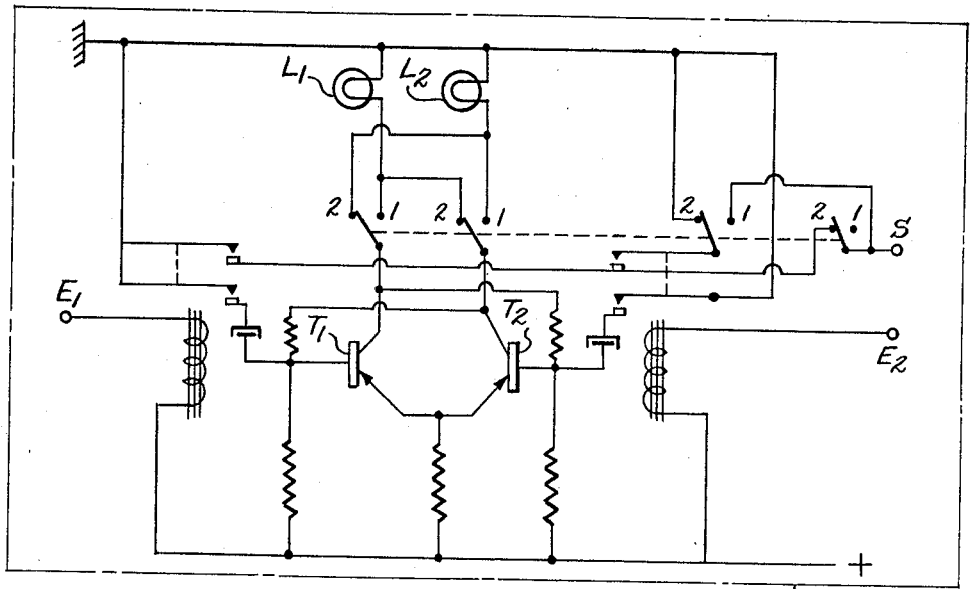
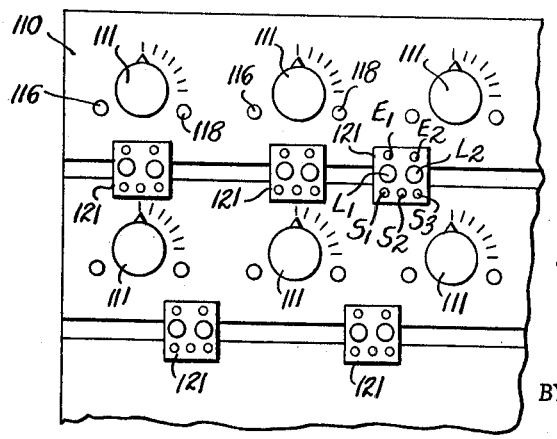
Fig. 6.
Fig. 7.
INVENTORS
CHARLES F. MARQUIS
PIERRE G. DRIAY
PAUL P. LAMBILLIOTTE
BY
Bacon & Thomas
ATTORNEYS Oct. 21, 1969  C. F. MARQUIS ET AL  3,474,240
APPARATUS FOR ANALYZING GRAPHICALLY PLOTTED INFORMATION
Filed Feb. 11, 1966  4 Sheets-Sheet 4

INVENTORS
CHARLES F. MARQUIS
PIERRE G. DRIAY
PAUL P. LAMBILLIOTTE
BY Bacon & Thomas
ATTORNEYS United States Patent Office 3,474,240
Patented Oct. 21, 1969

3,474,240
APPARATUS FOR ANALYZING GRAPHICALLY
PLOTTED INFORMATION
Charles F. Marquis, 55 Faubourg Saint-Antoine; Pierre
G. Driay, 7 Rue Bremontier; and Paul P. Lambilliotte,
117 Avenue du General Michel Bizot, all of Paris,
France
Filed Feb. 11, 1966, Ser. No. 526,791
Claims priority, application France, Feb. 12, 1965,
5,372; Apr. 6, 1965, 12,075
Int. Cl. G06g 7/48, 7/50, 7/62
U.S. Cl. 235—185                                7 Claims

ABSTRACT OF THE DISCLOSURE

A plurality of circuit devices are set up to define a plurality of alternate interconnected paths from a pulse input to an output, an adjustable delay device is connected in each segment of each path and indicators indicate the order of receipt of pulses from converging path segments. A timer device indicates the total elapsed time for passage of a selected pulse from the input to the output and the indicators then show the path followed by said pulse.

---

The present invention relates to a new method and apparatus permitting practical and rapid calculations connected with graphs which are applicable to numerous industrial problems.

It is known to show with the aid of generally antisymmetrical graphs whole operations having an industrial, commercial, or other character, such as the stages of manufacture, the elements of a cost price, the flight information of aircraft or information regarding transport networks. These graphs are constituted by a number of points, which are positioned in the same plane, and which are also known as vertices of the graph. They are connected by a number of oriented arcs arranged in such a manner that if two vertices are the ends of one or more arcs, the connection between these two points is directed in a single sense.

In order to illustrate this definition, reference will be made in the following to the diagrams used for the planning of projects or plans known under the name of PERT diagrams (Program Evaluation Research Task). For simplification, we shall limit ourselves to the number of operations shown by an antisymmetrical graph comprising a single input vertex and a single output vertex, it being understood that the method and apparatus according to the present invention can be applied to all types of graphs, even those having a plurality of inputs or outputs.

To each oriented arc of the graph there corresponds a given phase of operation and the corresponding estimated or actual execution time. This permits the graph to be plotted at the time of a project and this plan to be modified with regard to the variable time or possible the plotting. The essential problem which it is desired to solve is that of determining the critical paths, i.e. searching for the longest succession of operative phases in time. The series of corresponding arcs connecting the input to the output of the graph thus represents the various operations in which one delay in the execution will delay the carrying out of the whole of the program. This critical path constituted by the series of arcs may also in other applications correspond not only to the longest time but to a total of values, such as cost prices and then one will be able to determine the path representing the maximum or minimum value or time.

Taking for example the PERT diagram shown in FIGURE 1, of the accompanying drawings, it comprises a group of ten operations represented by the arrowed arcs $t(12)$, $t(13)$, $t(24)$, $t(25)$, $t(36,)$, $t(47)$, $t(56)$, $t(57)$, $t(68)$, and $t(78)$. They originate from the input vertex V1 and converge via intermediate vertices V2, V3, V4, V5, V6 and V7 towards the output vertex V8 representing the result of the operations. Each arc is representative of a time $t(12)$, $t(13)$, $t(24)$, $t(25)$, $t(36)$, $t(47)$, $t(56)$, $t(57)$, $t(68)$, and $t(78)$. The longest time corresponding to the critical path will be one of the following:

$t(1368) = t(13) + t(36) + t(68)$
$t(12568) = t(12) + t(25) + t(56) + t(68)$
$t(12578) = t(12) + t(25) + t(57) + t(78)$
$t(12478) = t(12) + t(24) + t(47) + t(78)$

It is obvious that in the case of FIGURE 1 the calculation is sufficiently easy to avoid having to resort to a special equipment, but as soon as a graph comprises several tens of arcs, simple calculation becomes impracticable. The method and apparatus according to the present invention afford a simple and practical solution for these problems, which is available to users who do not possess large electronic computers.

According to the invention, a pulse transmitting device representing the input vertex of the graph is provided, adjustable delay devices corresponding to each oriented arc are arranged to represent the graph. A discriminator is provided having as many inputs as there are convergent operations corresponding to each point of convergence of two or more operations terminating at the same point. This discrimminator indicates the input through which it has received the last or the first pulse. To each vertex where only one oriented arc leads, the electrical conductor branches into as many branches as there exist arcs issuing from the vertex in question.

Moreover, the operation consists in adjusting each delay device as a function, preferably linear, of the estimated or actual time of the operative phase which is being represented, so that when the input device emits a pulse the various discriminators indicate the inputs corresponding to the critical path and if the output discriminator is provided with a clock triggered by the input device, it will be able to indicate the time corresponding to the critical or optimum path.

The invention will now be further described, by way of example, with reference to the accompanying drawings, in which:

FIGURE 5 is an axial section of a delay device;

FIGURE 6 is a diagrammatic representation of a discriminator;

FIGURE 7 is a partial view of the plate 110 of FIGURE 5 and the devices which it carries.

Figure 1:
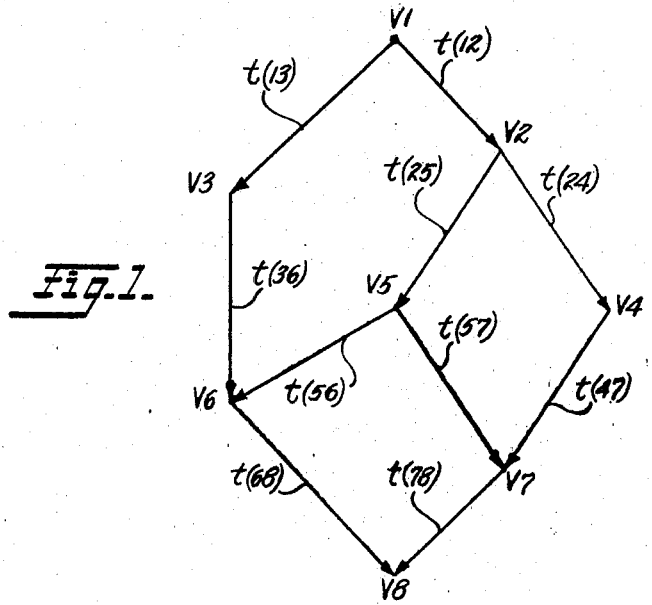
FIGURE 1 is an illustration of a simple PERT diagram.
Figure 2:
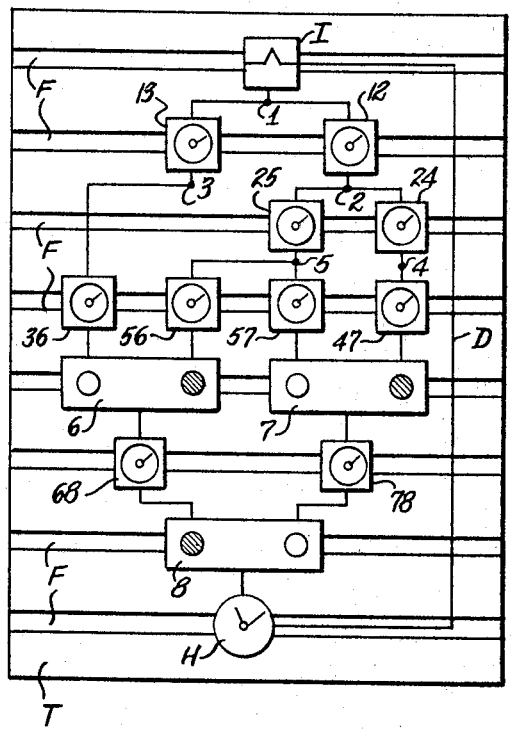
FIGURE 2 is a schematic illustration of apparatus according to the invention representing the diagram of FIGURE 1.

Referring to FIGURE 2, the board T has positioning means F capable of receiving the various devices. On the board there are positioned a pulse emitting device I, a clock H and a triggering conductor D connecting the device I to the clock H. At the output of the device I a conductor is divided at point 1 into two branches joining the device I to the timing mechanisms or delay devices 12 and 13. The point 1 associated with the pulse emitting device I corresponds to the vertex V1 of the graph of FIGURE 1. The delay devices 12 and 13 correspond to the arcs designated in FIGURE 1 by $t(12)$ and $t(13)$ respectively the same numerical reference. On the board T have been mounted in a similar manner the delay devices 24, 25, 36, 47, 56, 57, 68 and 78, and the various conductors connecting the outputs of these delay devices to the other apparatus. The vertices V2, V3, V4 and V5 of the graph correspond to the points bearing the corresponding numbers in FIGURE 2. On the other hand, the converging vertices V6, V7 and V8 of the graph have been represented by discriminators 6, 7 and 8 having two inputs receiving the pulses coming from the delay devices which correspond to the arcs converging at points V6, V7 and V8 of the diagram. These discriminators comprise devices for indicating the input through which the first or second pulse has arrived; such as signal lamps or tubes, which are shown schematically by clear circles (illuminated) or hatched circles (extinguished).

The apparatus thus comprises a plurality of detachable and interchangeable devices comprising pulse emitters, delay devices, discriminators and clocks as well as connecting conductors. These devices may be mounted on the board T which is provided with means for fixing them thereto and with means for supplying the various devices with the necessary current and/or voltage. The means F are shown as comprising grooves in board T.

After having arranged the devices to represent the paths of said diagram, a scale of times is chosen so that actual values represented, which can be very long periods of time, are represented by short periods of time proportional thereto, which permit the duration of the triggering pulse and the desired accuracy of calculation to have a sufficiently short duration for ease of calculation. Then the delay devices are adjusted in order that they emit a pulse with a delay which is proportional to the actual time with respect to the moment when they have themselves received this pulse. After the delay devices are adjusted and a pulse is emitted by the device I, this pulse passes through the various branch circuits and is subjected to the delays encountered in the various devices which have been previously adjusted. The discriminators are arranged to indicate, by an extinguished lamp, the last pulse received. The clock H has been triggered directly by the conductor D coming from the device I. If the clock is stopped by the discriminator 8 at that moment when the last pulse received by the latter brings about the extinction of one of the lamps, it will indicate the time corresponding to the critical path. The latter is determined by referring to the lamps of the discriminators. FIGURE 2 shows that the critical path ends at 8 having come from 6 since it is the lamp corresponding to the input 68 of the discriminator 8 which is extinguished. Similarly, the critical path arrives at 6 coming from points 5 and 2. It is therefore the path 1-2-5-6-8 which is the critical path. The operations corresponding to the various arcs of this path are thus those whose delays of execution it will be particularly advantageous to survey, if it is indispensable to avoid any delay in the execution of the whole project.

As the various operative phases of the project are being carried out, the periods of time corresponding to the actual duration of the operations are carried back to the devices for adjusting the delay devices, which permits variations with respect to the project and possible modifications to be given to the critical path to be followed, particularly when an operation outside the preceding critical path has taken such a delay that it is through this operation that the new path will pass. Not only may the periods of time be possibly modified, but, if this is necessary, one can return to other operations and change the diagram and the arrangements of the elements on the board T.

Figure 3:
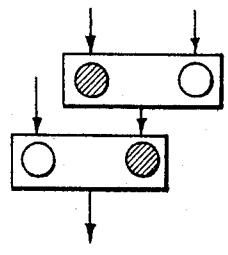
FIGURE 3 is a schematic representation of a cascade of discriminators having a plurality of inputs.

These different elements can be of known type. In particular there exist numerous forms of delay devices such as timing mechanisms. With regard to the discriminators, any electrochemical, electrical or electronic bistable device may be suitable and in particular devices of the triggered type. In the latter case, the problem may arise of having to discriminate the pulses coming from three delay devices which would correspond, on the diagram, to three arcs converging towards a common vertex. Now, a trigger circuit comprises only two inputs, so one may then resort to an assembly of two discriminators such as that shown in FIGURE 3 which consists in arranging them in cascade by connecting the output of one to an input of the other. This arrangement may be generalised to a discrimination of $n$ inputs, by means of $n-1$ discriminators in cascade.

Figure 4:
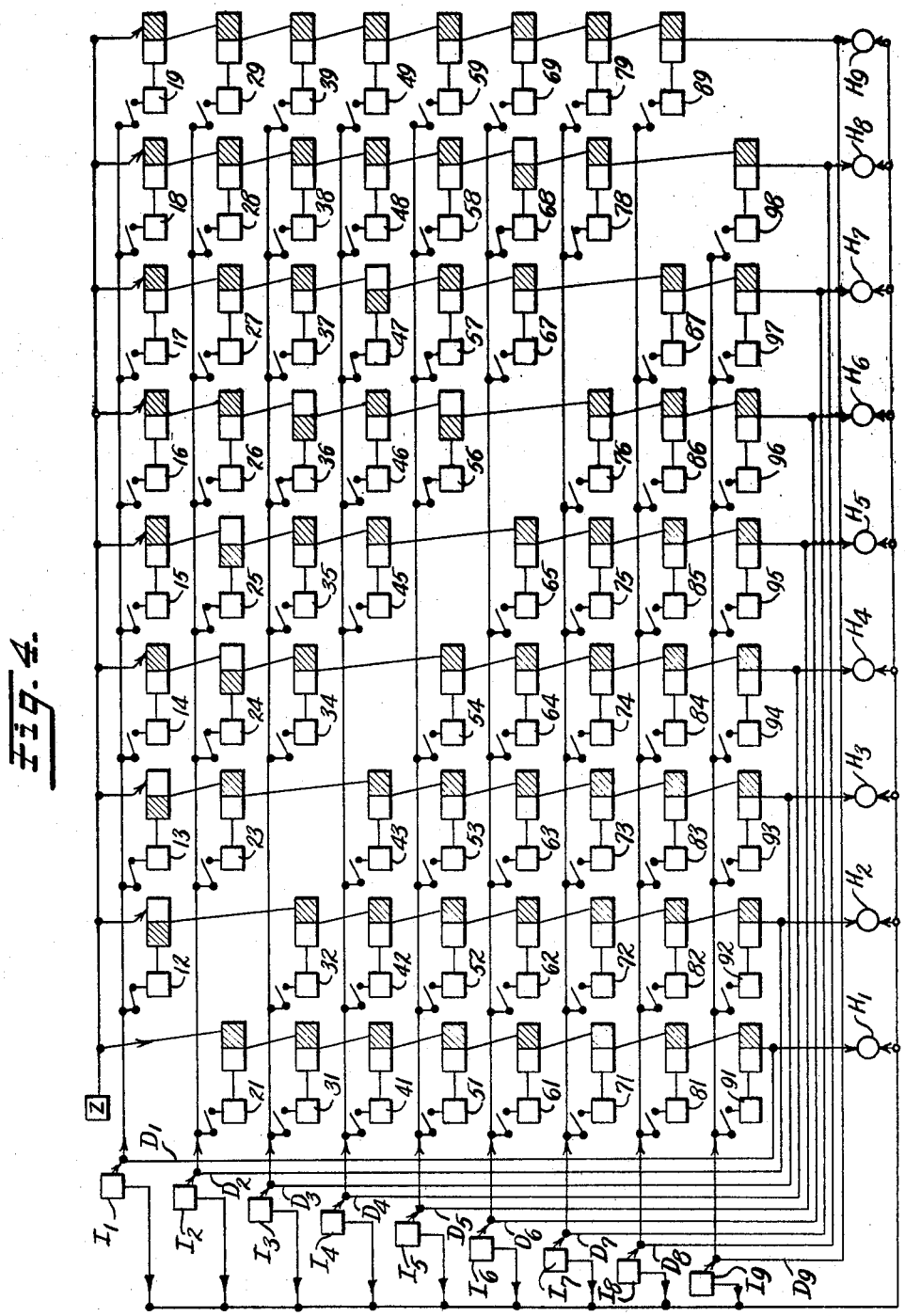
FIGURE 4 is a diagrammatic illustration of a fixed apparatus having $n$ inputs and $n$ outputs.

While FIGURE 2 shows an apparatus comprising a board on which elements are arranged according to the graph of the diagram which is the object of the calculations, in another embodiment shown in FIGURE 4, a chassis supports an arrangement of fixed apparatus connected to a board permitting them to be connected together with the aid of a set of plugs, conductors or jacks. In order to simplify FIGURE 4, the connecting plugs have been placed near the various delay devices. As this apparatus is provided for effecting calculations on graphs having $n$ vertices, it comprises $(n-1)n$ elementary calculating cells each composed of a delay device 12–98 carrying the numerical references of an arc of a graph having $n$ vertices, associated with a discriminator having two inputs and with a switch which, in practice, can take the form of a plug, jack or the like and be placed on a board whose overall dimensions are smaller than the chassis carrying the calculating cells. This board will itself be interchangeable and this will permit various diagrams to be studied, simply by changing the board, since the set of plugs constitutes the part of the electrical arrangement varying with the graph of the diagram. As each cell carries the number of an arc, the first figure corresponds to its beginning, the second to its end. All the discriminators of the cells of the same second figure are connected in cascade. All the switches of the cells of the same first figure are connected in shunt to a conductor receiving a pulse from a trigger $I_1$, $I_2$, etc., or the pulses coming from the cascade of discriminators, the second figure of which corresponds to the number of the trigger. Clocks $H_1$, $H_2$, etc. are connected at the output of each cascade of discriminators. A triggering conductor $D_1$, $D_2$, etc. causes the clocks to start when a pulse is emitted by one of the devices $I_1$, $I_2$, etc. Another pulse emitter Z feeds the discriminators at the head of the cascade at their input opposite the corresponding delay device. The latter permits the arrangement to be returned to zero after calculation has been effected.

When the diagram is plotted, the vertices are numbered, then the switches bearing the numbers of the arcs are closed with the aid of the plugs of the board. A return to zero pulse is transmitted in order to ensure that all the discriminators trigger on the same side, this lighting up all the delay signal lamps. Then the delay devices are adjusted as has been mentioned previously, and a pulse is transmitted from the emitter bearing the number of the input vertex. By being positioned, for example, as in the diagram of FIGURE 1, the discriminators 12 and 13 trigger. The pulse coming from the cell 12 and that coming from the cell 13 will respectively feed the cells 24 and 25, and the cell 36, and so on as far as the cascade of discriminators bearing the number of the output vertex 8. Beginning with this cascade, the number of the cell whose discriminator has triggered, here 68, is set up. Then one refers back to the cascade whose number is 6 (beginning of 68) and the number of the triggered discriminator is set up. The first encountered when starting from the bottom 56 and so on, the critical path will be set up; 68, 56, 25, 12 and on the clocks H8, H6, H5, H2 may be read the passage times of the final pulse corresponding to the critical path. As the project advances, so one will proceed with the new adjustment of the delay devices or possibly with the modification of the graph of the diagram by displacing the plugs.

This apparatus also permits graphs having a plurality of inputs and outputs and which are not anti-symmetrical, to be studied. If it is desired to be limited to those having a single input, only one emitter I will be necessary. Similarly, all the clocks can be merged into one recording apparatus having as many tracks as there are cascades, or even into a single clock placed for example at the bottom of the last cascade, whose number will always have to be taken as the number of the output vertex.

One can also be limited to the single anti-symmetrical graphs which are moreover most frequent, for that which is of practical application. Then all the cells situated in the half of the chassis beneath the free diagonal (the latter corresponds in fact to the cells 11, 22, 33 etc. which would represent zero arcs) will be saved. But in this case, it will be necessary to number the vertices of the graph in an ever increasing manner from the input to the output.

In the embodiment, of FIGURE 5, a lower chassis comprising plates 101 supports the various elements and in particular the discriminators (not shown in the figure). This chassis also carries one part of the delay devices, constituted mainly by a ratchet wheel 102 mounted on a shaft 103 freely rotatable on the chassis 101. The upper part of this shaft 103 carries a plate 104 provided with a stop 105. The chassis 101 is constructed so that the assembly 102, 103, 104 and 105 is electrically insulated. The ratchet wheel 102 is driven by an electromagnet 106 actuating an advancing pawl (not shown) by any conventional means. Another electromagnet 107 ensures the return to zero, i.e. a return to the initial position by triggering the ratchet and by the action of a spiral spring 108. The advancing electromagnet 106 is fed with current in the form of regular pulses in time, the electromagnet 107 operating by a special circuit manually controlling the return to zero. The assembly 102, 103, 104, 105 may be taken to any voltage by means of a small friction device 109. A movable plate 110 may be mounted above the chassis 101. It supports a certain number of control buttons 111 whose shaft 112 carries at its lower part a plate 113 having a stop 114. The assembly 111, 112, 113 is arranged coaxially with an assembly, 102, 103, 104, of the chassis 101. The stops 105 and 114 are at such a distance from the shafts 103 and 112 that, during the rotation of the plates 104 and 113, they come into contact with one another. The assemblies 111, 112, 113, 114 are mounted so that they are electrically insulated with respect to the plate 110. A small friction member 115 enables this assembly to be connected by a wire conductor to an output stud 116. It is thus understood that if the electromagnet 106 is fed so that it receives at input conductor 117 a regular square voltage in time and that there is placed an input switch 118 permitting, during ist closing by contacting female member 122, the advancing device to operate, this arrangement is such that with the input switch 118 energized, the assembly 102, 103, 104 and 105 begins to rotate and turns at an angle proportional to the number of pulses received at 117. When the stops 105 and 114 come into contact, there is established an electrical circuit connecting the friction member 109 to the output 116, this permitting in particular the transmission of pulses through the elements 109, 103, 104, 105, 114, 113, 112, 115, 116, or more generally the closing of a second circuit.

If for example the friction member 109 is connected to ground, as indicated in FIGURE 5, it can be used to be connected to an input of another delay device.

Figure 8:
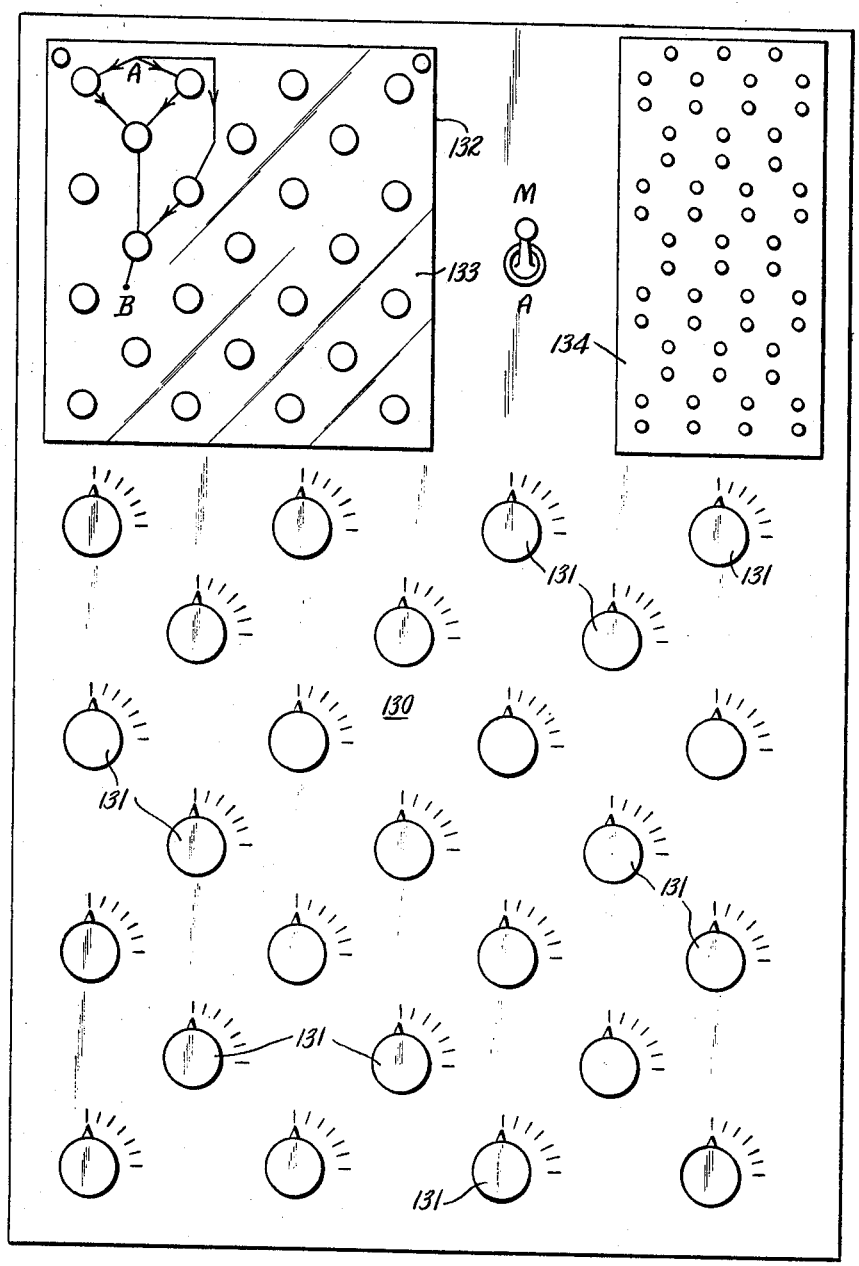
FIGURE 8 is a frontal view of the apparatus according to another embodiment.

FIGURE 6 shows the circuit diagram of a discriminator of conventional type, consisting mainly of a small bistable device, which is shown with two transistors $T_1$, $T_2$ and two lamps $L_1$, $L_2$, indicating through which input, $E_1$ or $E_2$, the first or last pulse arrives. The changing of the electrical assembly transforming the discriminator so that it designates the first or last pulse is ensured by a two-position reversing device 120. The output of the discriminator is indicated at S. These discriminators are mounted in small assemblies or boxes shown at 121 in FIGURE 7. Each box comprises two inputs $E_1$ and $E_2$, mounted as indicated in FIGURE 6, and three output studs $S_1$, $S_2$, $S_3$ connected to the output S indicated in FIGURE 6. On the plate 110 are arranged the series of control buttons 111 permitting the adjustment of the delay devices provided with their input 118 and their output 116. The output 118 may be constituted by a female member 122 arranged in the plate 110, below which are arranged two conductive and flexible blades which any male plug penetrating into the female socket 122 will engage. A system of connecting cords and plugs placed at the various inputs and outputs of the apparatus thus permits the production of a device in accordance with the principle of apparatus known in the prior art. The circuits for supplying the various components have not been shown in the preceding description, these being within the scope of the man skilled in the art. FIGURES 5, 6, and 7, thus show an assembly comprising an essentially fixed part, connected to the chassis 101 and a movable plate comprising the circuit constituted by the various cords, the discriminators whose positioning may be modified if the plate 110 has, for example, grooves on which the boxes 121 may be mounted as desired, and the knobs for adjusting the delay devices. Therefore, by changing the plate 110, this permits passage from the logic circuit corresponding to a given graph to the logic circuit of another graph. FIGURE 8 shows another embodiment based on the same principle. A chassis 130 carries the various devices (pulse emitter, delay devices, discriminators); the knobs 131 for regulating the delay devices are shown on the front of the external surface. The pilot-lamps $L_1$, $L_2$ of the discriminators are arranged on a small board 132 on which a plate 133 made of transparent material, such as methyl polymethacrylate, may be removably mounted. The graph studied may be plotted, with the aid of suitable means, on this plate 133. Thus it is understood that when the graph is changed, it is sufficient to see the results of changing the plate 133 and to substitute one corresponding to the electrical assembly studied. Finally, a device known in the field of the electrical or electronic computers presents a movable board 134 with which are connected the inputs and outputs of the different electrical or electronic constituents. The connections are ensured by cords provided with two plugs. This thus permits the passage from one graph to the other simply by changing the connecting board.

While particular embodiments have been described, it will be understood that various modifications may be made without departing from the scope of this invention. In particular it will be apparent that the invention may be applied to graphs whose arcs represent quantities which are measured in units other than time.

We claim:

1. Apparatus for analyzing graphic information, comprising:
   at least one pulse emitting means;
   means for directing said pulses along a plurality of paths toward an output terminal;
   at least one delay means in each of said paths for delaying transmission of a pulse therepast for a predetermined number of pulse intervals;
   a pair of said paths converging toward a common point, and defined by a discriminator means, said discriminator means having a pair of input means for respectively receiving pulses from the paths of said pair; and
   means on said discriminator for indicating the order in which pulses are received from said paths.

2. Apparatus as defined in claim 1 including timer means; means for starting said timer means in response to emission of a first pulse by said pulse emitting means; and means for stopping said timer means in response to receipt of a predetermined pulse at a selected one of said discriminator means.

3. Apparatus as defined in claim 1 comprising a base member having at least portions of certain of said means fixed thereon; the remaining portions of said certain means and the other means being removably mounted on said base member.

4. Apparatus as defined in claim 3 wherein said certain means comprise said delay devices, the said remaining portions thereof comprising means for adjusting and controlling said delay devices.

5. Apparatus as defined in claim 3 wherein said remaining portions of said certain means comprise terminals for effecting connection of said directing means.

6. Apparatus as defined in claim 3 wherein said remaining portions comprise at least a portion of said discriminator means.

7. Apparatus as defined in claim 6 wherein said indicating means are signal lamps carried by said remaining portions of said discriminator means.

References Cited

UNITED STATES PATENTS

| | | | |
|---|---|---|---|
| 2,831,162 | 4/1958 | Gross | 324—68 |
| 3,050,713 | 8/1962 | Harmon | 324—68 X |
| 3,289,323 | 12/1966 | Fondahl | 35—24 |
| 3,290,797 | 12/1966 | Opel | 35—24 |
| 3,380,177 | 4/1968 | Wagner | 35—24 |

MALCOLM A. MORRISON, Primary Examiner

FELIX D. GRUBER, Assistant Examiner

U.S. Cl. X.R.

35—24.2; 235—184; 324—68